Oct. 29, 1957 N. J. REGNIER 2,811,638
RECEIVER SELECTIVELY RESPONSIVE TO AMPLITUDE MODULATION, SINGLE SIDE BAND OR CONTINUOUS WAVE SIGNALS
Filed Nov. 9, 1953
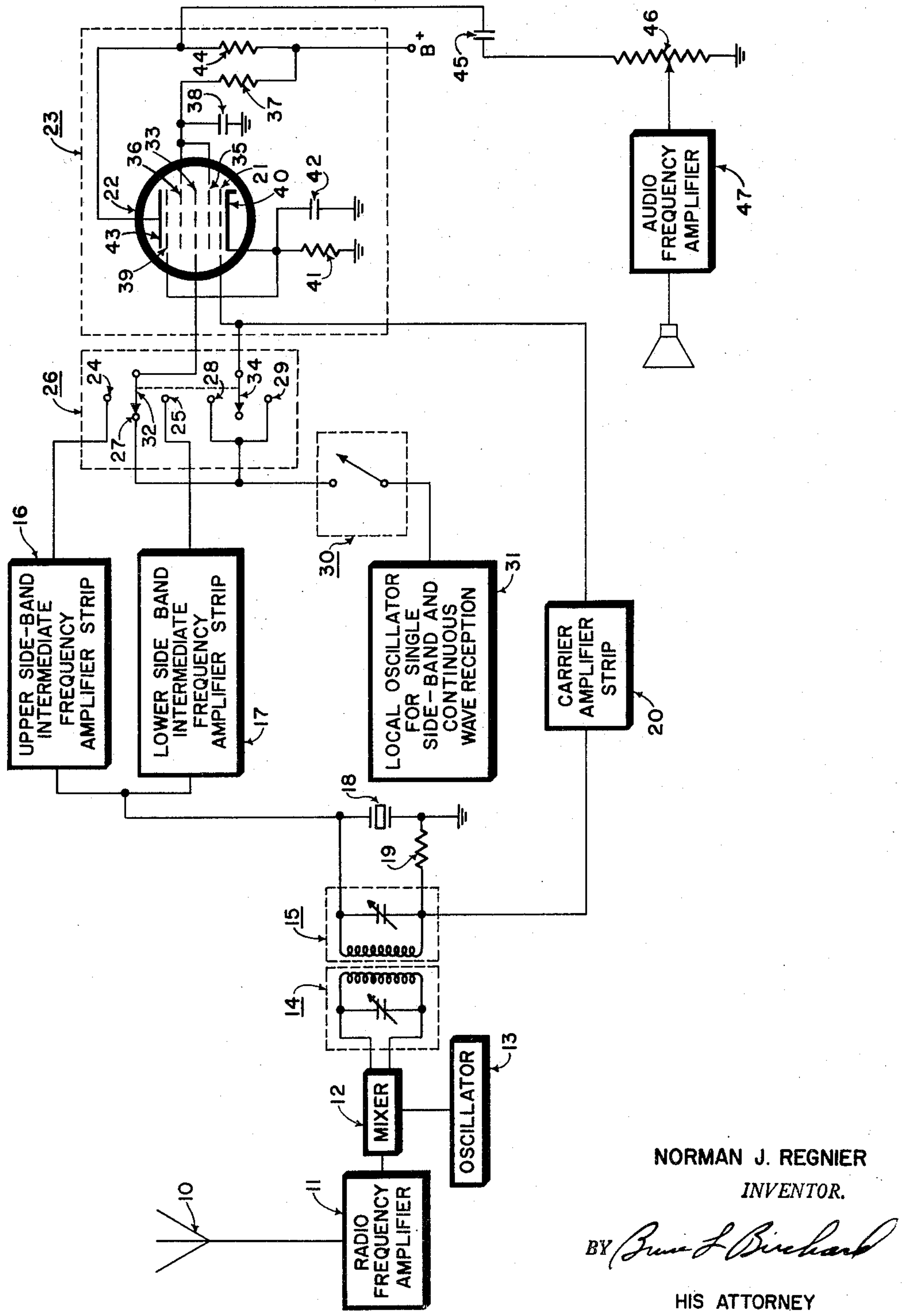
NORMAN J. REGNIER
*INVENTOR.*
BY Bruce L. Birchard
HIS ATTORNEY United States Patent Office 2,811,638

Patented Oct. 29, 1957

2,811,638

RECEIVER SELECTIVELY RESPONSIVE TO AMPLITUDE MODULATION, SINGLE SIDE BAND OR CONTINUOUS WAVE SIGNALS

Norman J. Regnier, San Leandro, Calif., assignor to Hoffman Electronics Corporation, a corporation of California Application November 9, 1953, Serial No. 391,101

2 Claims. (Cl. 250—20)

This invention is related to apparatus for receiving intelligence-bearing signals and more particularly to an improved circuit for amplifying and detecting high frequency signals.

In the past, many circuits have been employed to amplify and detect high frequency signals in radio receivers. Invariably certain problems are encountered which render such circuits deficient in some respect. For example, the band-pass of conventional high frequency amplifier circuits for high-fidelity receivers is too wide for optimum selectivity, and, further, admits comparatively high noise levels.

Therefore, it is an object of this invention to provide an improved circuit for receiving intelligence-bearing signals.

It is a further object of this invention to provide an improved circuit for amplifying and detecting high frequency signals in radio receivers.

It is a still further object of this invention to provide an improved circuit for amplifying and detecting high frequency signals which will provide for inter-station noise suppression, reduce on-station interference due to external noise, increase selectivity of reception, and provide fidelity equal to the band-pass of the high frequency amplifier.

According to this invention, the high frequency carrier is fed to a sharply tuned carrier amplifier strip, while the side-bands are fed to and amplified by either an upper side-band amplifier or a lower side band amplifier, whichever is selected. If modulated carrier wave reception is being employed, the output of the selected side-band amplifier is coupled to a demodulator stage, together with the output of the carrier amplifier strip; if continuous wave reception is being employed, the output of the carrier amplifier strip is coupled to the demodulator stage, together with the output of a local oscillator whose frequency is such that the intermodulation of the two signals will produce an intelligible output signal from the demodulator; and if single side-band reception is being employed, the output of the selected side-band amplifier is coupled to a demodulator stage, together with the output of a local oscillator. The resultant output of the demodulator is coupled to the subsequent amplifier section of the receiver.

The features of the present invention which are believed to be novel are set forth with particularity in the appended claims. The present invention, both as to its organization and manner of operation, together with further objects and advantages thereof, may best be understood by reference to the following description, taken in connection with the accompanying drawing, in which:

The single figure is a diagram of a superheterodyne radio receiver employing an amplifier and detector circuit according to this invention.

In the figure, an incoming intelligence-bearing signal, if present, is intercepted by antenna 10 and amplified by radio-frequency amplifier 11, the output of which is fed in a conventional manner to mixer stage 12, to which also is fed the output of heterodyning oscillator 13. The intermediate frequency output signal from mixer 12 is coupled from tuned circuit 14 to tuned circuit 15. One end of tuned circuit 15 is connected to upper side-band intermediate frequency amplifier strip 16, to lower side-band intermediate frequency amplifier strip 17, and also through crystal filter 18 to ground. The other end of tuned circuit 15 is connected through resistor 19 to ground, and to carrier amplifier strip 20. The output of carrier amplifier strip 20 is connected to grid 21 of vacuum tube 22 in demodulator stage 23. Upper side-band amplifier strip 16 and lower side-band amplifier strip 17 are connected to terminals 24 and 25, respectively, of gang-switch 26. Terminals 27, 28, and 29 of gang-switch 26 are connected through switch 30 to local oscillator stage 31. Arm 32 of gang-switch 26 is connected to grid 33 of vacuum tube 22. Arm 34 of said gang-switch is connected to grid 21 of vacuum tube 22. Screen grids 35 and 36 are connected through common screen load resistor 37 to a source of positive voltage (B+), and through filter capacitor 38 to ground. Suppressor grid 39 is connected to cathode 40 in a conventional manner. Cathode 40 is connected through resistor 41 and capacitor 42 bias elements to ground. Anode 43 of vacuum tube 22 is connected through anode load resistor 44 to a source of positive voltage (B+). The signal developed across resistor 44 is resistance-capacitance coupled through capacitor 45 to potentiometer 46, the output across which is fed into receiver audio amplifier 47.

The circuit of the figure operates as follows:

Intelligence-bearing signals are intercepted by antenna 10, amplified in radio frequency amplifier 11, and fed in a conventional manner into mixer stage 12, together with the output of heterodyning oscillator 13. The output of mixer stage 12 is coupled from tuned circuit 14 to tuned circuit 15. Crystal filter 18 has a resonant frequency equal to that of the intermediate frequency carrier, and also exhibits a very narrow pass-band. The side-band intermediate frequency amplifier strips may, for example, be tuned, respectively, to frequencies seven and one-half kilocycles above and below the carrier intermediate frequency, and have a pass-band fourteen thousand cycles wide.

For conventional amplitude modulated carrier wave reception, arm 32 of gang switch 26 is positioned at terminal 24 or terminal 25, and switch 30 is opened. Thus, the carrier, at intermediate frequency, is filtered out of the input to side band amplifier strips 16 and 17, and, instead, is tapped from resistor 19 and fed into sharply tuned intermediate frequency carrier amplifier strip 20, the output of which is applied to control grid 21 of demodulator tube 22. The selected side-band is amplified by its associated intermediate frequency side-band amplifier strip, the output of which is applied to grid 33 of demodulator vacuum tube 22. Thus, the carrier and selected side-band signals are intermodulated and produce the desired audio output across anode load resistor 44 which is resistance-capacitance coupled to the audio frequency amplifier section of the receiver. It is to be noted that if upon choosing one of the two side-band intermediate frequency amplifier strips the noise level is found to be objectionable, the operator may switch to the other side-band intermediate frequency amplifier strip.

For single side-band reception switch 30 is closed. Arm 32 of gang-switch 26 may be set at either position 24 or position 25, as in modulated carrier wave reception. The output from local oscillator 31 supplants the output from carrier amplifier strip 20. Except for this change in the source of the heterodyning signal, the operation of demodulator stage 23 is the same as that described in connection with conventional amplitude modulated carrier wave reception.

For continuous wave (C. W.) reception, switch 30 is closed and arm 32 of gang-switch 26 is placed at position 27. The intermediate frequency signal from mixer stage 12 is taken from resistor 19 and fed into intermediate frequency carrier amplifier strip 20, the output of which is applied to grid 21 of demodulator tube 22. No signals pass through the side-band intermediate frequency amplifier strips, because there is no modulation, in the usual sense. Switch 30 being closed, the output of local oscillator 31 is applied to grid 33 of demodulator tube 22. Hence, the desired audio output appears across anode load resistor 44, and becomes available for amplification in the receiver audio frequency amplifier section.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. A versatile receiver for receiving, selectively, amplitude modulated signals, single side band signals, and continuous wave signals including, in combination, filter means for separating carrier wave signals, if present, from modulation components; a first amplifying channel for amplifying said carrier wave signals only; a second amplifying channel for amplifying said modulation components only, said second amplifying channel including a lower side band amplifier and an upper side band amplifier; a detector stage having a first input circuit and a second input circuit; and local oscillator means selectively coupled to either or neither of said first and second input circuits of said detector stage, said first amplifying channel being coupled to said first input circuit of said detector stage, and said upper and lower side band amplifiers being selectively coupled to said second input circuit of said detector stage.

2. A versatile receiver for receiving, selectively, amplitude modulated signals, single side band signals, and continuous wave signals including, in combination, filter means for separating carrier wave signals, if present, from modulation components; a first amplifying channel for amplifying said carrier wave signals only; a second amplifying channel for amplifying said modulation components only, said second amplifying channel including a lower side band amplifier and an upper side band amplifier; a detector stage having a first input circuit and a second input circuit, said detector stage including a vacuum tube provided with first and second control electrodes coupled respectively to said first and second input circuits of said detector stage; and local oscillator means selectively coupled to either or neither of said first and second input circuits of said detector stage, said first amplifying channel being coupled to said first input circuit of said detector stage, and said upper and lower side band amplifiers of said second amplifying channel being selectively coupled to said second input circuit of said detector stage.

References Cited in the file of this patent

UNITED STATES PATENTS

| | | |
|---|---|---|
| 2,494,323 | Weber | Jan. 10, 1950 |
| 2,575,047 | Crosby | Nov. 13, 1951 |

FOREIGN PATENTS

| | | |
|---|---|---|
| 505,926 | Great Britain | May 19, 1939 |
| 663,664 | Great Britain | Dec. 27, 1951 |

OTHER REFERENCES

Article, "Selective demodulation" by Harris, pages 565–572, Proc. IRE, for June 1947.